United States Patent
Clark

(10) Patent No.: US 6,217,767 B1
(45) Date of Patent: *Apr. 17, 2001

(54) VACUUM SPARGING PROCESS FOR TREATING CONTAMINATED GROUNDWATER AND/OR WASTEWATER

(75) Inventor: Remly Paul Clark, Wilmington, NC (US)

(73) Assignee: Clark Environmental Services, Wilmington, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/147,090

(22) Filed: Nov. 3, 1993

Related U.S. Application Data

(63) Continuation of application No. 07/829,959, filed on Feb. 3, 1992, now abandoned.

(51) Int. Cl.$^7$ .................................. C02F 1/26; C02F 3/02

(52) U.S. Cl. ........................ 210/610; 210/620; 210/747

(58) Field of Search ................................ 210/603, 610, 210/611, 620, 747, 170, 901

(56) References Cited

U.S. PATENT DOCUMENTS

| | | |
|---|---|---|
| 657,951 | 9/1900 | Mooney . |
| 3,559,739 | 2/1971 | Hutchison ........................ 166/311 |
| 3,596,993 | 8/1971 | Busey .............................. 299/5 |
| 3,637,021 | 1/1972 | Hutchison et al. ............... 166/302 |
| 4,017,120 | 4/1977 | Carlson et al. ..................... 299/5 |
| 4,114,864 * | 9/1978 | Jager et al. .................. 261/DIG. 9 |
| 4,351,119 * | 9/1982 | Meunier ............................ 34/65 |
| 4,401,569 * | 8/1983 | Jhaveri et al. .................. 210/610 |
| 4,615,564 | 10/1986 | Garrett ............................. 299/7 |
| 4,660,639 | 4/1987 | Visser et al. ..................... 166/267 |
| 4,765,902 * | 8/1988 | Ely et al. ........................ 210/610 |
| 4,923,125 | 5/1990 | Bateson et al. .................... 241/20 |
| 4,947,509 * | 8/1990 | Dinkelmann ...................... 15/301 |
| 5,018,576 * | 5/1991 | Udell et al. ..................... 210/747 |
| 5,116,515 * | 5/1992 | Selesnick ........................ 210/747 |
| 5,148,969 * | 9/1992 | Boucher et al. .................. 156/584 |
| 5,180,503 * | 1/1993 | Gorelick et al. ................. 210/170 |
| 5,240,475 * | 8/1993 | Andersson et al. ................. 95/99 |
| 5,893,680 * | 4/1999 | Lowry et al. .................... 405/128 |

OTHER PUBLICATIONS

Herrling et al. In Situ Groundwater Remediation of Strippable Contaminants by Vacuum Vaporization Wells (UVB): Operation of the Well and Report About Cleaned Industrial Sites. Presented at the Third Forum on Innovative Hazardous Waste Treatment Technologies: Domestic and International: Jun. 11–13, 1991, Dallas, Texas, pp 1–45.

Webster's II New Riverside University Dictionary, (1994), pp. 1273 and 1281.

"AC, Refrig. and Heating Terminology, Determining Heat Loss, Temp. Control Terms", Grainger 1997 Catalog, p. 3801.

Michael R. Lindeburg, P.E., "Engineer–in–Training Reference Manual,"8th ed., (1992).

* cited by examiner

*Primary Examiner*—Ivars Cintins
(74) *Attorney, Agent, or Firm*—Jenkins & Wilson, P.A.; Jennifer L. Skovd

(57) ABSTRACT

A process for the removal of hydrocarbon contaminates from groundwater and/or wastewater in ground wells, treatment trenches or above-ground tanks which utilizes differential pressure between the area above the groundwater and/or wastewater and the purging gas introduced therein to the upward flow of bubbles of the purging gas through the groundwater and/or wastewater requiring stripping or volatilization to remove the hydrocarbon contaminates therefrom.

26 Claims, 5 Drawing Sheets

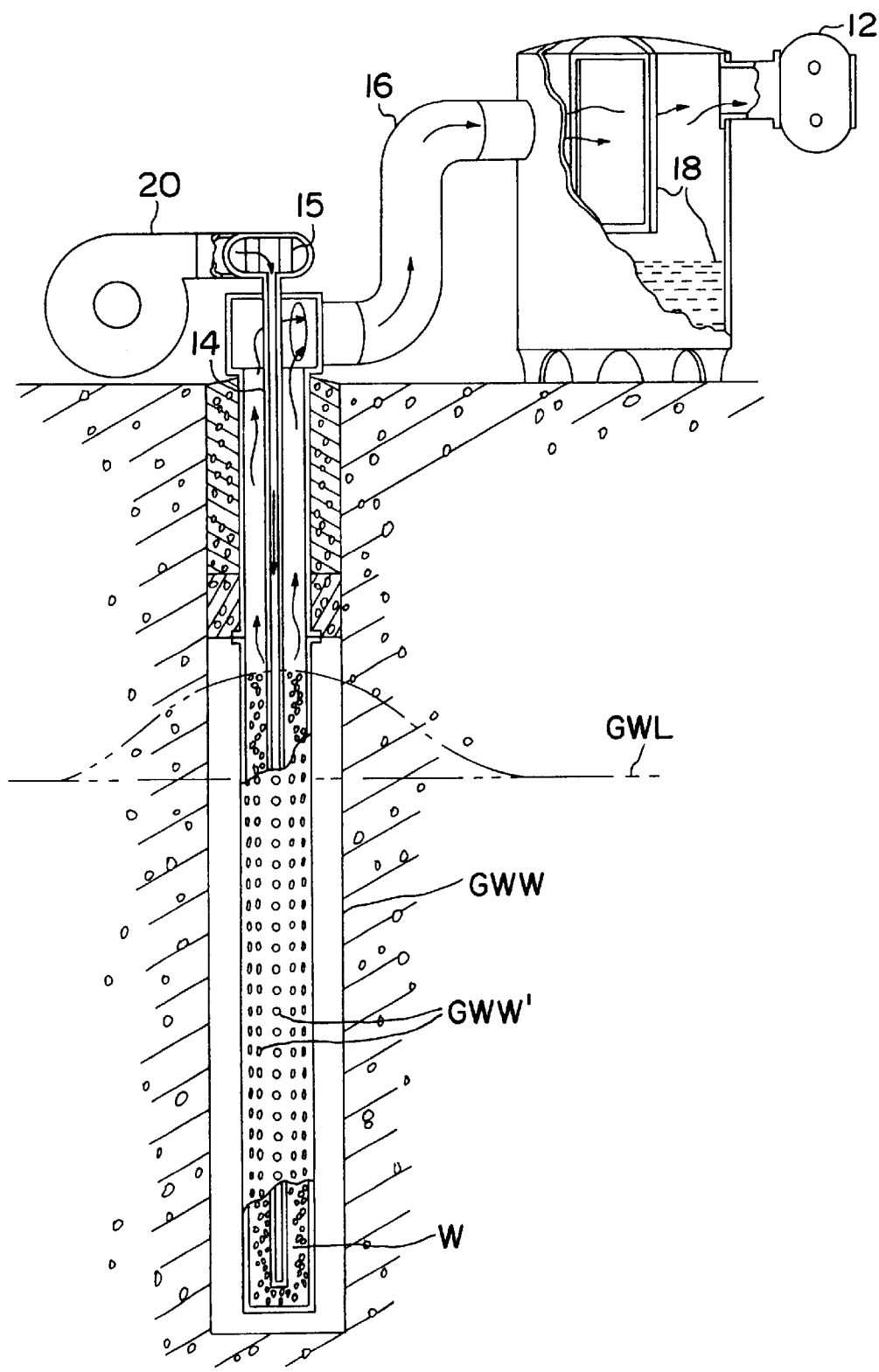
FIG. IA

VACUUM SPARGING PROCESS FOR TREATING CONTAMINATED GROUNDWATER AND/OR WASTEWATER

This is a continuation of application Ser. No. 07/829,959 filed on Feb. 3, 1992, now abandoned.

TECHNICAL FIELD

The present invention relates generally to the removal of contaminants from groundwater and/or wastewater. More specifically, the invention relates to a novel process for the removal of hydrocarbon contaminants from groundwater and/or wastewater by a novel vacuum sparging process wherein differential pressure is used to assist in the flow of a purging gas through the contaminated groundwater and/or wastewater in order to strip or volatilize the hydrocarbon contaminants therefrom.

RELATED ART

The discovery of groundwater contaminated by hydrocarbons has, on a national and world-wide scale become of great significance due to the high costs of restoration and to the large number of identified cases. Remedial technologies currently being utilized on a grand scale include groundwater extraction and treatment, in-situ bioremediation, vapor extraction (above water table) and chemical injection.

Groundwater extraction and treatment is probably the most commonly utilized approach. This process includes pumping contaminated groundwater from wells or trenches and facilitating above-ground treatment and discharge either to surface water, Publicly Owned Treatment Works or rein-filtration (exfiltration). Groundwater extraction is accomplished utilizing a wide variety of pump types, depending upon site-specific conditions. Treatment is usually afforded by (1) pressure sparging (tank aeration), (2) packed column air strippers, (3) bioreactors, (4) carbon filtration, or (5) a combination of the above methods. Tank aeration involves the addition of pressurized air to the treatment vessel through diffusers, etc. Packed column air strippers utilize counter-current air forced upward through a packed column or tower while contaminated water flows downwardly therethrough. Bioreactors are akin to most wastewater treatment plants where degrading organisms are artificially enhanced to proliferate and consume or break down organic compounds, and carbon filtration is utilized to remove organic constituents by adsorption.

In-situ bioremediation is often implemented on a site-specific suitability basis (i.e., where the hydrogeological environment allows for the proliferation of suitable hydrocarbon degrading microorganisms by either introducing nutrients or bacteria into the groundwater system or by monitoring the natural proliferation of biodegrading species). Air or oxygen is sometimes introduced into the system by pressure sparging or by the addition of oxygenating chemicals.

Vapor extraction is utilized in the removal of vapor-phase hydrocarbons above the water table using a vacuum. Chemical injection is usually utilized as an assistant to biodegradation through the direct injection of chemicals into groundwater or process tanks.

Specific prior art references of interest include

U.S. Pat. No. 4,923,125 to Bateson et al. which discloses a process for treating contaminated soil wherein hydrophobic materials are released in a liquid to interface with air bubbles and float to the top of a flotation cell. U.S. Pat. No. 4,017,120 to Carlson et al. discloses a process for the production of hot brines from liquid dominated geothermal wells by gas lifting. Also of note, U.S. Pat. No. 4,660,639 (Reissue 33,102) to Visser et al. discloses a vapor extraction process for vadose zone volatile compound removal.

DISCLOSURE OF THE INVENTION

In accordance with the present invention, applicant provides a process for removing hydrocarbon contaminants from groundwater and/or wastewater including the steps of subjecting the surface area of the groundwater and/or wastewater to at least a partial vacuum and then positioning at least one conduit into the groundwater and/or wastewater wherein the distal end is submerged therein and the proximal end is located above the groundwater and/or wastewater. A purging gas is introduced under at least atmospheric pressure into the proximal end of the conduit so that the gas will form bubbles as it flows from the distal end thereof wherein the bubbles serve to remove the hydrocarbon contaminants from the groundwater and/or wastewater as they travel upward to the surface area thereof. Finally, the contaminated gases are removed from the surface area of the groundwater and/or wastewater.

It is therefore the object of this invention to provide a novel process for the removal of semi-volatile and volatile hydrocarbon compounds from in-situ groundwater.

It is another object of the present invention to provide a novel process for the removal of semi-volatile and volatile hydrocarbon compounds from above-ground groundwater and/or wastewater treatment tanks.

It is still another object of the present invention to provide a novel process for the low cost removal of hydrocarbon contaminants from groundwater and/or wastewater located in groundwater wells, treatment trenches and above-ground treatment tanks by means of the novel application of existing and readily available equipment.

Some of the objects of the invention having been stated, other objects will become evident as the description proceeds when taken in connection with the accompanying drawings described hereinbelow.

BRIEF DESCRIPTION OF THE DRAWINGS

FIG. 1A illustrates an alternative embodiment of the process shown in FIG. 1 wherein the purging gas is introduced into the contaminated water under pressure;

BEST MODE FOR CARRYING OUT THE INVENTION

Figure 1:
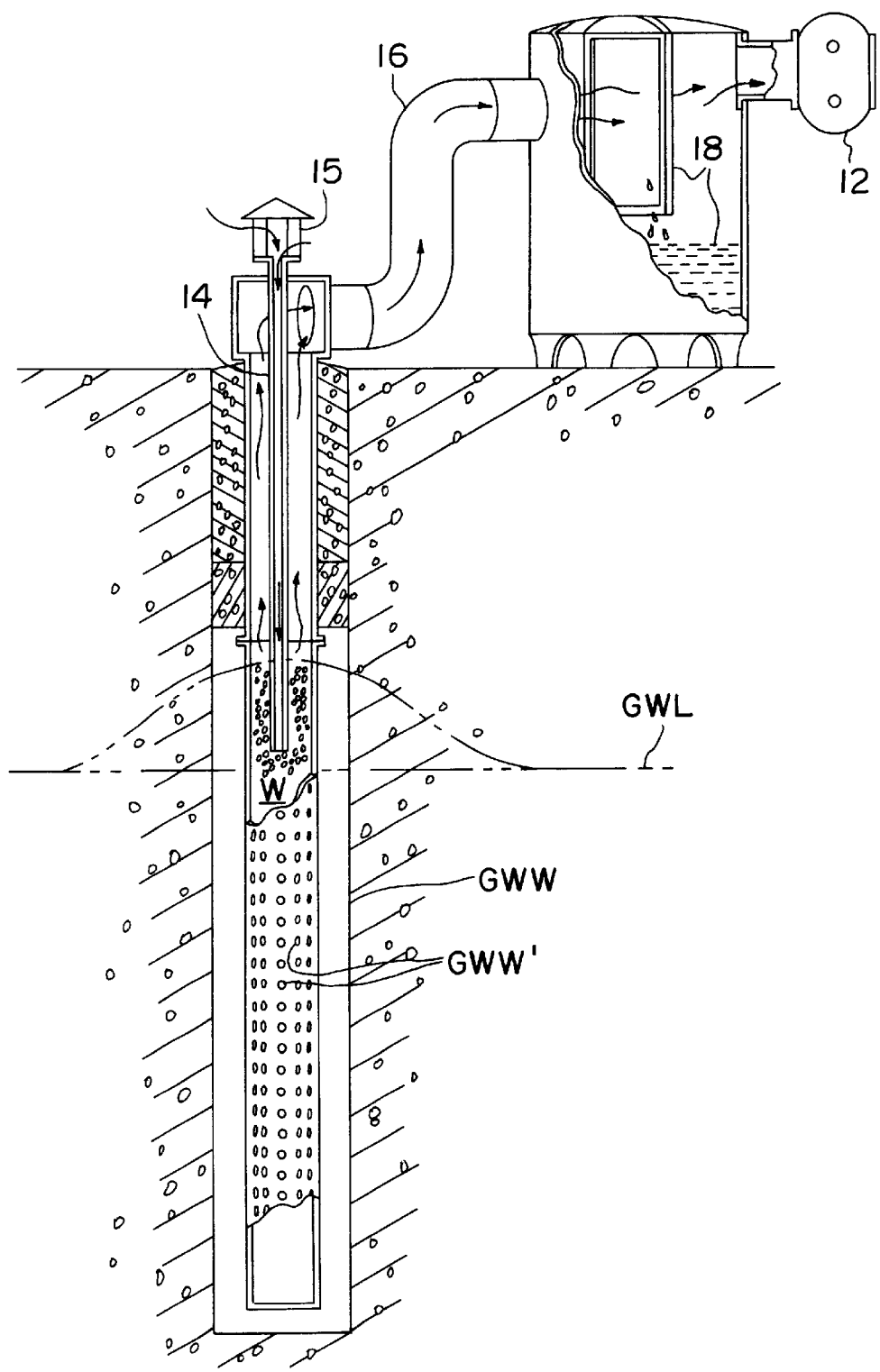
FIG. 1 is a vertical cross-section view of the process of the invention being practiced on a contaminated groundwater well.
Figure 2:
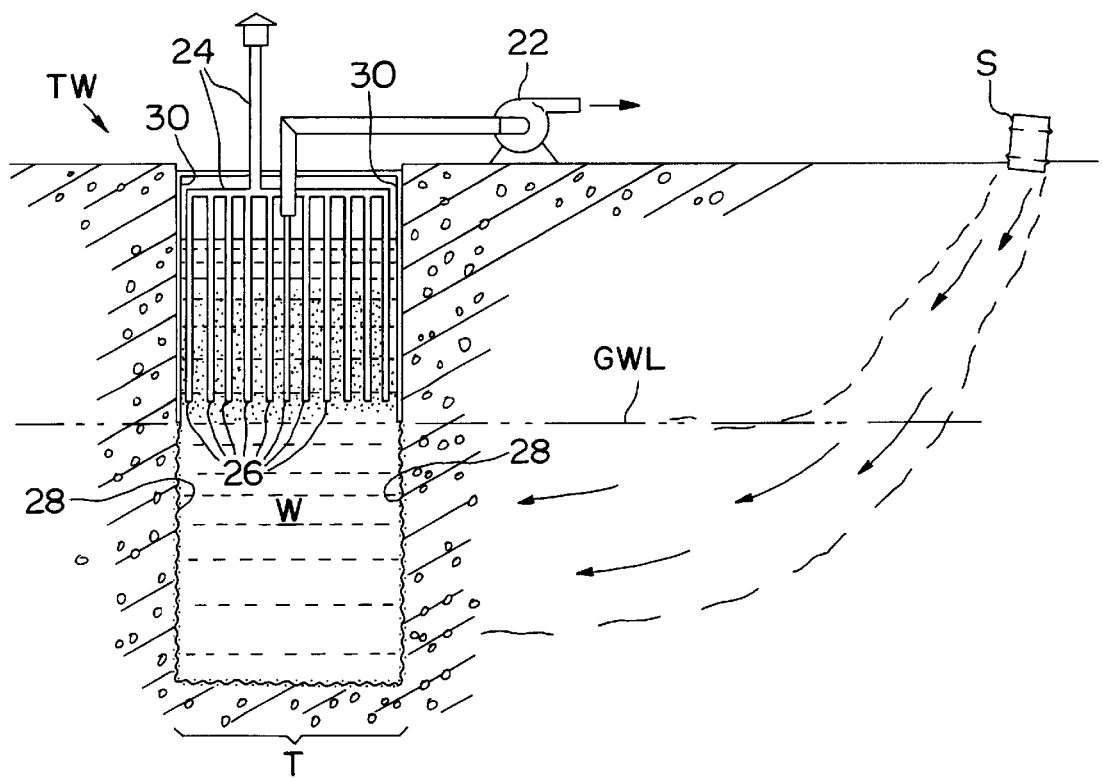
FIG. 2 is a vertical cross-section view of a second embodiment of the present invention wherein the novel process is being practiced on a treatment trench formed in proximity to a contaminated groundwater site.
Figures 3, 3A:
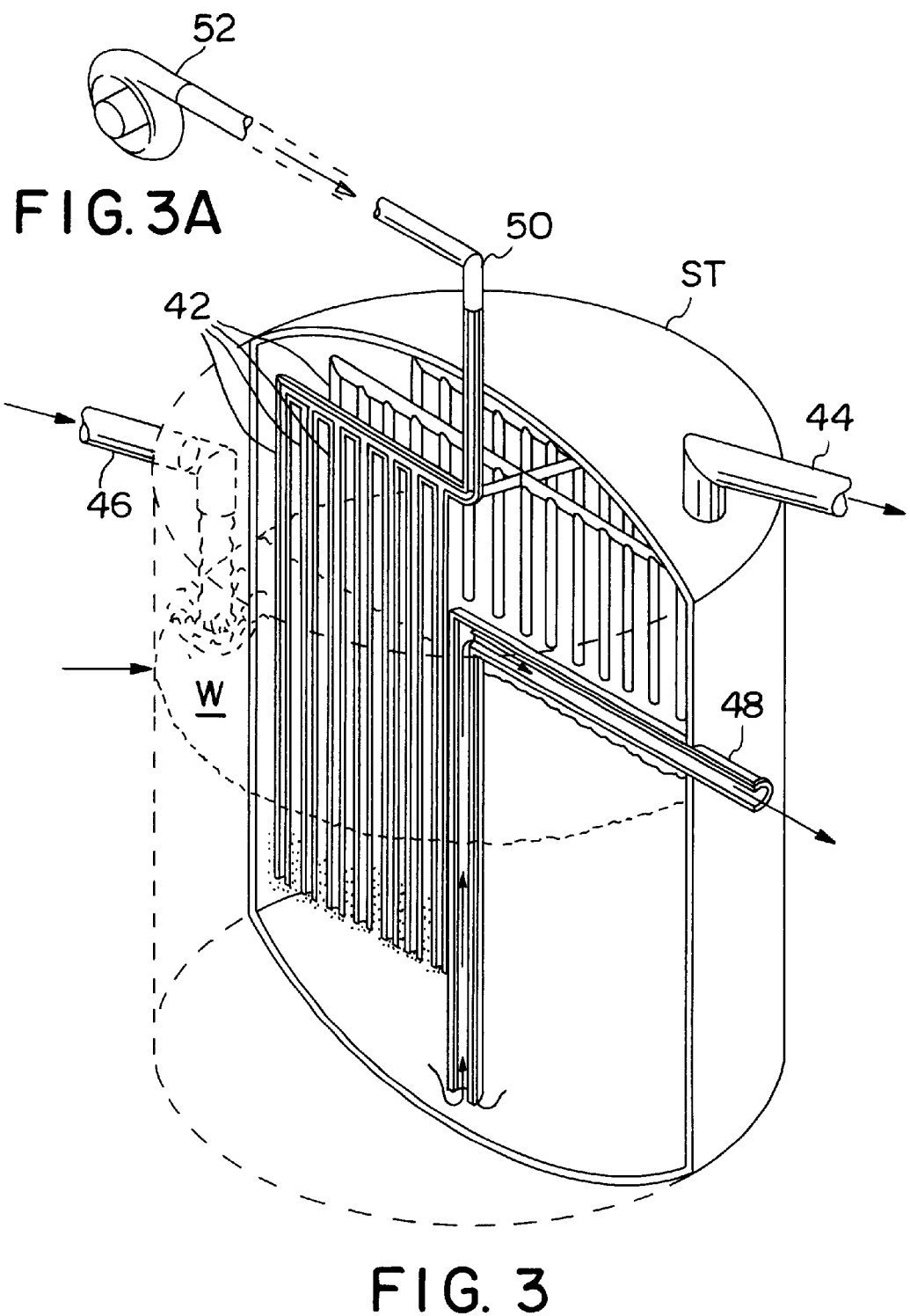
FIG. 3 is a vertical cross-section view of a third embodiment of the present invention wherein the novel process is practiced on an above-ground treatment tank containing contaminated groundwater and/or wastewater.
FIG. 3A illustrates an alternative embodiment of the process shown in FIG. 3 wherein the purging gas is introduced into the contaminated water under pressure.

Referring now more specifically to FIGS. 1–3, applicant will now describe the novel process of the invention in sufficient detail to enable one skilled in the art to practice the novel process as well as alternative embodiments and variations in the application of the invention to the removal of hydrocarbon contaminates from groundwater and/or wastewater.

Groundwater Wells

FIG. 1 depicts a primary application of the process of the present invention which involves applying suction to groundwater well GWW with vacuum pump 12 while allowing air to enter tube or pipe 14 through atmospheric intake 15. Although only one pipe 14 is shown in FIGS. 1 and 1A, applicant contemplates that two or more pipes 14 could also be used in the practice of this embodiment of the invention. The air flows downward through pipe 14 and exits as bubbles which move upwardly through the water column while volatilizing the contaminants therein. The transfer of contaminants from water W to the bubbles facilitates a zone of groundwater decontamination and the emerging contaminated gases above the groundwater level GWL are inherently routed through conduit 16 toward vacuum pump 12 where the gases may be discharged, recovered or treated. FIG. 1 illustrates a process where condensate recovery is desired, and thus the gas is routed through liquid collection trap 18. The process also offers the option for creating an even higher differential pressure between the surface of the groundwater and the air within tube 14 by attaching pressure source 20 to atmospheric intake 15 (see FIG. 1A). Also, biological nutrients may easily be added to the intake air for promoting aerobic micro-biological degradation and/or more efficient purging gases may be added (e.g., oxygen, ozone, nitrogen, helium, etc.) to enhance volatilization.

More specifically, the present invention is widely applicable to contaminated wells and to aquifer restoration through the use of such wells. In practicing the process, air pressure is reduced above the aquifer so as to create an upwelling of groundwater consistent with the sustained differential pressure. The upwelling condition will have a geometry which is dependent upon the conductivity (permeability) of air in the subsurface. A bubbler pipe 14 is installed and sealed in the vacuum system so that its inlet 15 is exposed to atmospheric pressure (or to a pressure source) and its outlet is exposed below the liquid level in the well where pressure will be less than the atmospheric pressure under dynamic conditions. The depth of submergence and extent of upwelling must be considered when selecting a vacuum pump 12. The diameter of the bubbler pipe or pipes 14 should be practically chosen to create the smallest possible bubble because smaller bubbles have a larger unit surface area and will more effectively transfer volatile constituents.

Thus, when a vacuum is applied to well GWW, two processes are initiated. One is an uplifting of groundwater in the well and, to lesser degrees, surrounding the well. It is important that the apertures GWW' or slotted intervals of well GWW, extend above the raised water level, allowing air pressure to be reduced in areas proximal to the well, thereby developing and sustaining a fully developed upwelling condition.

The other dynamic process is the movement of air through the tube or pipe 14 to its outlet (facilitating bubbles) which is at a point below the raised water level. The outlet may be adjusted to a point just above the original static water table (when the conduit inlet is exposed to atmospheric pressure) while the raised water level is sustained. Thus, the pressure needed to initiate flow through pipe 14 is facilitated. Pipe 14 may be adjusted to lower intervals by adding positive pressure to the conduit inlet. These same two processes apply also to treatment walls described in detail hereinafter.

By way of further detailed description, when an appropriate vacuum is applied to the system, bubbles will exit the pipe 14 outlet and move upward through the column of water W, effecting liquid-gas transfer and causing an upcurrent of water by air displacement. The water is stripped of contaminants and a convection process is set up. The stripped water moves downslope along the surface of the upwelled cone and facilitates the movement of additional contaminated water W into the well. The physical extent of convection is dependent upon geological and hydrogeological characteristics and the overall system design. The rate of flow in the convection process is primarily dependent upon hydraulic conductivity, gradient and effective porosity, and may be simply defined, as follows:

$$V = \frac{k\,dh/dl}{Ne} \text{ (Darcy's Law)}$$

where:

$V$ = velocity $k$ = hydraulic conductivity $dh/dl$ = gradient $Ne$ = effective porosity The extent of the forced convection defines the area by which liquid-gas transfer occurs and is a function also of the temperature of the groundwater and the heat transfer coefficient of the surrounding material. Removal rates of the hydrocarbon contaminants from the groundwater W can be calculated by a general model for gas in liquid system proposed by Matter-Muller (1981) for estimating the mass transfer efficiency, as follows:

$$F = Qg*H*(Cg/H - C_1)*(1 - \exp(K_1 a)V_1/HQg)$$

where:

Qg=gas flow rate

Cg=inlet gas concentration

H=dimensionless Henry's Constant $K_1 a$=overall mass transfer coefficient $V_1$=total liquid volume This equation incorporates diffusion, initial concentrations, temperature, bubble size, density, viscosity, surface area, and volume as a portion of the parameters involved in calculating the contamination removal rates.

Beyond the convection cell, diffusion of adjacent contaminants toward the well GWW will be governed by liquid-liquid mass transfer which is generally described by the Stokes-Einstein equation, as follows:

$$D = K_B T / 6\mu R_0$$

where:

D=diffusion coefficient in liquids CM/S)

K=Boltzmann's Constant=$1.38 \times 10^{-16}$ gcm$^2$/S$^2$K

=solvent viscosity (H$_2$O) (g/cm-s)

$R_0$=solute radius (xylene) (CM) C$_8$H$_{10}$

T=temperature (K)=293 K

Because the direction of groundwater movement is temporarily changed and because only under stagnant conditions would the two dimensional model described above be valid at all points around the well, the natural horizontal movement of groundwater must also be considered. The actual convection process is affected by the flow, and flow is expected to become helical while under the influence of convection.

Flow-through Interceptor Treatment Walls

Where site-specific conditions allow, the invention is easily applied in the form of a flow-through treatment wall TW as shown in FIG. 2. Therein, the contaminant groundwater flow regime from contaminant source S is intercepted by a specially constructed trench T which acts as a process wall. Treatment wall TW comprises vacuum pump 22, manifold 24, bubbler tubes or pipes 26, permeable barrier 28, impermeable barrier 30, and optional pressure source 32 for applying a gas to pipes 26 at a greater than atmospheric pressure (see FIG. 2A). Treatment walls TW may be constructed to facilitate a continuous linear zone of groundwater W treatment.

In this embodiment of the invention, the implementation of convection may be less important in areas adjacent to trench T, because convection cells will form adjacent to bubbler tubes or pipes 26. If a sufficiently porous and permeable barrier 28 is utilized, and a large number of sparging pipes 26 are installed, only the liquid-gas mass transfer rate must be used in designing the optimal process system. It is important that bubble size be kept small and in great number, that the entire trench T be affected by bubbles, and that the natural flow through trench T be matched by sufficient aeration to remove the desired quantity of contamination. It is very important that the air outlets from pipes 26 be maintained at an equal elevation with respect to groundwater level GWL in order to ensure an even distribution of airflow across trench T.

Figure 2A:
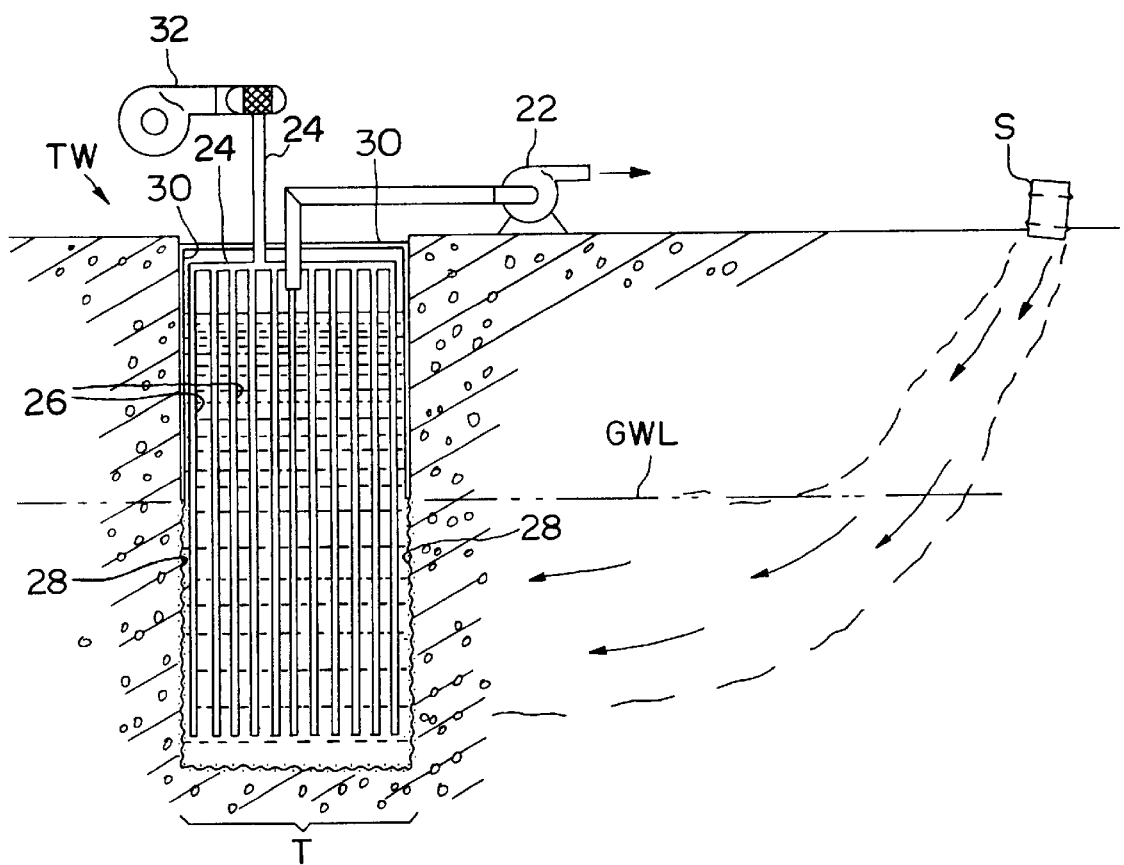
FIG. 2A illustrates an alternative embodiment of the process shown in FIG. 2 wherein the purging gas is introduced into the contaminated water under pressure.

Although FIGS. 2 and 2A depict trench T being filled exclusively with groundwater W. it should be understood that applicant contemplates that the invention also provides for filling trench T with a packing material sufficiently open and porous so as to facilitate the contaminant stripping process and convective movement of groundwater W within trench T. The packing material (not shown) would be provided as a "skeletal" material or support to assume maintenance of porosity and permeability in trench T.

Tank/vessel Applications

Vacuum sparging may also be utilized for removal/recovery of strippable contaminants using surface mounted process tanks ST. This process involves the incorporation of vacuum sparging into an above-ground treatment process. FIG. 3 depicts a simple application involving a flowing system which requires aeration. Tank ST is appropriately selected to withstand vacuum pressure and an inverted fluid outlet is necessary, as shown in FIG. 3.

In the example, a series of air introduction pipes 42 (or, alternatively, a diffuser system which could be utilized in this embodiment as well as the other two embodiments of the invention disclosed herein) is mounted to the top of tank ST using appropriate fittings. As in the two previous embodiments of the invention, a vacuum pump (not shown) applies suction via conduit 44 to the wastewater W in tank ST while air enters through pipes 42 and travels downwardly through the wastewater W therein. Influent pipe 46 and effluent pipe 48 serve to provide and remove, respectively, wastewater from tank ST to continuously process wastewater W therethrough. It is important that the elevation of the (equally sized) air outlets or orifice outlets of pipes 42 near the bottom of tank ST are equal to insure an even air flow distribution. The vacuum equipment must be capable of delivering the design air flow with static and dynamic head losses considered.

Air is introduced through conduit 50 where other introduction gases or liquids can be added, or a pressure source (52 in FIG. 3A) can be attached to increase differential pressure in the system. Air pipes 42 can also be tilted near the bottom of tank ST to create a velocity of bubbles in one direction, thus producing a fluid vortex, which will help to create even air distribution and encourage increased design retention time through the use of a "tank bottom center" outlet (not shown). A pump (not shown) could also be utilized to create the vortex.

Vacuum sparging may be utilized in above-ground treatment tanks where efficient aeration is desired. Here the desired mass transfer rate can be facilitated using the liquid-gas mass transfer equation described hereinbefore and the utilization of a large number of pipe bubbler lines of a small diameter.

Applicant has found during development of the instant invention that regenerative blowers such as the EG&G ROTRON DR series (which depending upon exact vacuum and airflow requirements is capable of delivering flow rates of up to 1800 SCFM with suction capability of up to 140 IWG) are best suited for generating a partial vacuum as well as vacuum flow over the top surface of contaminated groundwater and/or wastewater in the various embodiments of the invention described in detail hereinbefore. Also, auxiliary positive pressure sources such as the aforementioned regenerative blower, SUTORBUILT CALIFORNIA F series positive displacement blowers, M-D pneumatic rotary positive displacement blowers and SULLAIRE OR KAISER screw compressors have been found suitable as positive displacement blowers or air compressors to introduce purging gases under pressure in the several processes described herein of the present invention. Finally, above-ground tanks must be selected for practicing the process of the instant invention which are capable of sustaining vacuum pressure without collapse. Although many above-ground tanks would be suitable for this use, applicant has discovered that cylinderical steel, reinforced fiberglass, and high density polyethylene tanks with collapse vacuum pressures which safely exceed the vacuum capacity of the selected vacuum source (in concert with liquid storage) are suitable for this use.

Although a plurality of pipes are shown in the treatment wall and treatment tank embodiments of the invention, applicant contemplates that a single conduit or diffuser system could be utilized in the practice of both of these embodiments of the present invention.

It will be understood that various details of the invention may be changed without departing from the scope of the invention. Furthermore, the foregoing description is for the purpose of illustration only, and not for the purpose of limitation—the invention being defined by the claims.

What is claimed:

1. A method for removing hydrocarbon contaminants from groundwater and/or wastewater, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater by routing said contaminated gases through said vacuum pump where said contaminated gases are discharged.

2. A method according to claim 1 wherein said purging gas is selected from the group consisting of air, oxygen, nitrogen, ozone and helium.

3. A method for removing hydrocarbon contaminants from groundwater located in a groundwater well, said groundwater having a surface area, consisting essentially of the steps of:

first subjecting the surface area of said groundwater well to at least a partial vacuum via a vacuum pump creating an upwelling of said groundwater;

then providing in said groundwater a plurality of conduits, each of said conduits having a distal end and a proximal end, wherein the distal ends are submerged therein and the proximal ends are located above said groundwater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater as they are volatilized by said bubbles into contaminated gases that travel upward to the surface area of said groundwater; and then removing the contaminated gases from the surface area of said groundwater in said well by routing said contaminated gases through said vacuum pump where said contaminated gases are discharged.

4. A method according to claim 3 wherein said purging gas is selected from the group consisting of air, oxygen, nitrogen, ozone and helium.

5. A method for removing hydrocarbon contaminants from groundwater in a contaminated groundwater site consisting essentially of the steps of:

first forming a treatment trench proximate to said contaminated groundwater site and collecting groundwater in said treatment trench, said groundwater having a surface area;

then subjecting the surface area of said groundwater collected in said trench to at least a partial vacuum via a vacuum pump creating an upwelling of said groundwater;

then providing in said groundwater a plurality of conduits, each of said conduits having a distal end and a proximal end, wherein the distal ends are submerged therein and the proximal ends are located above said groundwater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater as they are volatilized by said bubbles into contaminated gases that travel upward to the surface area of said groundwater; and then removing the contaminated gases from the surface area of said groundwater in said treatment trench by routing said contaminated gases through said vacuum pump where said contaminated gases are discharged.

6. A method according to claim 5 wherein said purging gas is selected from the group consisting of air, oxygen, nitrogen, ozone and helium.

7. A method for removing hydrocarbon contaminants from groundwater and/or wastewater contained in an above-ground treatment tank consisting essentially of the steps of:

first introducing said contaminated groundwater and/or wastewater into said above-ground treatment tank, said groundwater and/or wastewater having a surface area;

then subjecting the surface area of said groundwater and/or wastewater in said treatment tank to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal end thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater in said treatment tank by routing said contaminated gases through said vacuum pump where said contaminated gases are discharged.

8. A method according to claim 7 wherein said purging gas is selected from the group consisting of air, oxygen, nitrogen, ozone and helium.

9. A method for removing hydrocarbon contaminants from groundwater and/or wastewater, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing at least one conduit in said groundwater and/or wastewater, said conduit having a distal end and a proximal end, wherein the distal end is submerged therein and the proximal end is located above said groundwater and/or wastewater;

then introducing a purging gas under at least atmospheric pressure into the proximal end of said conduit so that said gas will form bubbles as it flows from the distal end thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater by routing said contaminated gases through said vacuum pump where said contaminated gases are discharged.

10. A method for removing hydrocarbon contaminants from groundwater from a groundwater well, said groundwater having a surface area, consisting essentially of the steps of:

first subjecting the surface area of said groundwater to at least a partial vacuum via a vacuum pump creating an upwelling of said groundwater of said groundwater well;

then providing at least one conduit in said groundwater, said conduit having a distal end and a proximal end, wherein the distal end is submerged therein and the proximal end is located above said groundwater;

then introducing a purging gas under at least atmospheric pressure into the proximal end of said conduit so that said gas will form bubbles as it flows from the distal end thereof, said bubbles serving to remove said hydrocarbon contaminants from said groundwater as they are volatilized by said bubbles into contaminated gases that travel upward to the surface area of said groundwater; and then removing the contaminated gases from the surface area of said groundwater in said groundwater well by routing said contaminated gases through said vacuum pump where said contaminated gases are discharged.

11. A method for removing hydrocarbon contaminants from groundwater in a contaminated groundwater site consisting essentially of the steps of:

first forming a treatment trench proximate to said contaminated groundwater site and collecting groundwater in said treatment trench, said groundwater having a surface area;

then subjecting the surface area of said groundwater collected in said trench to at least a partial vacuum via a vacuum pump creating an upwelling of said groundwater;

then providing at least one conduit in said groundwater, said conduit having a distal end and a proximal end, wherein the distal end is submerged therein and the proximal end is located above said groundwater;

then introducing a purging gas under at least atmospheric pressure into the proximal end of said conduit so that said gas will form bubbles as it flows from the distal end thereof, said bubbles serving to remove said hydrocarbon contaminants from said groundwater as they are volatilized by said bubbles into contaminated gases that travel upward to the surface area of said groundwater; and then removing the contaminated gases from the surface area of said groundwater in said treatment trench by routing said contaminated gases through said vacuum pump where said contaminated gases are discharged.

12. A method for removing hydrocarbon contaminants from groundwater and/or wastewater contained in an above-ground treatment tank consisting essentially of the steps of:

first introducing said contaminated groundwater and/or wastewater into said above-ground treatment tank, said groundwater and/or wastewater having a surface area;

then subjecting the surface area of said groundwater and/or wastewater in said treatment tank to at least a partial vacuum via a vacuum pump creating an upwelling of said groundwater and/or wastewater;

then providing at least one conduit in said groundwater and/or wastewater, said conduit having a distal end and a proximal end, wherein the distal end is submerged therein and the proximal end is located above said groundwater and/or wastewater;

then introducing a purging gas under at least atmospheric pressure into the proximal end of said conduit so that said gas will form bubbles as it flows from the distal end thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater in said treatment tank by routing said contaminated gases through said vacuum pump where said contaminated gases are discharged.

13. A method for removing hydrocarbon contaminants from groundwater and/or wastewater located in a groundwater well, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater by routing said contaminated gases through said vacuum pump where said contaminated gases are discharged.

14. A method for removing hydrocarbon contaminants from groundwater and/or wastewater from a treatment trench formed in proximity to a contaminated groundwater site, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater by routing said contaminated gases through said vacuum pump where said contaminated gases are discharged.

15. A method for removing hydrocarbon contaminants from groundwater and/or wastewater from an open treatment trench formed in proximity to a contaminated groundwater site, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, wherein the plurality of conduits are positioned in said open treatment trench, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater by routing said contaminated gases through said vacuum pump where said contaminated gases are discharged.

16. A method for removing hydrocarbon contaminants from groundwater and/or wastewater from an above-ground treatment tank, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater by routing said contaminated gases through said vacuum pump where said contaminated gases are discharged.

17. A method for removing hydrocarbon contaminants from groundwater and/or wastewater from an above-ground treatment tank, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, wherein the plurality of conduits are positioned in said above-ground treatment tank, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater by routing said contaminated gases through said vacuum pump where said contaminated gases are discharged.

18. A method for removing hydrocarbon contaminants from groundwater and/or wastewater, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater, and wherein biological nutrients are added to said purging gas to promote aerobic microbiological degradation of said hydrocarbon contaminants; and then removing the contaminated gases from the surface area of said groundwater and/or wastewater by routing said contaminated gases through said vacuum pump where said contaminated gases are discharged.

19. A method for removing hydrocarbon contaminants from groundwater and/or wastewater, said groundwater and/or wastewater having a surface area, consisting essentially of the steps of:

first subjecting the surface area of said groundwater and/or wastewater to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater, and then removing the contaminated gases from the surface area of said groundwater and/or wastewater by routing said contaminated gases through said vacuum pump where said contaminated gases are discharged, and wherein said removed contaminated gases are passed through condensate recovery means to effect liquid collection.

20. A method for removing hydrocarbon contaminants from groundwater located in a groundwater well, said groundwater having a surface area, consisting essentially of the steps of:

first subjecting the surface area of said groundwater well to at least a partial vacuum via a vacuum pump creating an upwelling of said groundwater;

then providing in said groundwater a plurality of conduits, each of said conduits having a distal end and a proximal end, wherein the distal ends are submerged therein and the proximal ends are located above said groundwater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater as they are volatilized by said bubbles into contaminated gases that travel upward to the surface area of said groundwater, and wherein biological nutrients are added to said purging gas to promote aerobic microbiological degradation of said hydrocarbon contaminants; and then removing the contaminated gases from the surface area of said groundwater in said well by routing said contaminated gases through said vacuum pump where said contaminated gases are discharged.

21. A method for removing hydrocarbon contaminants from groundwater located in a groundwater well, said groundwater having a surface area, consisting essentially of the steps of:

first subjecting the surface area of said groundwater to at least a partial vacuum via a vacuum pump creating an upwelling of said groundwater;

then providing in said groundwater a plurality of conduits, each of said conduits having a distal end and a proximal end, wherein the distal ends are submerged therein and the proximal ends are located above said groundwater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater as they are volatilized by said bubbles into contaminated gases that travel upward to the surface area of said groundwater; and then removing the contaminated gases from the surface area of said groundwater in said well by routing said contaminated gases through said vacuum pump where said contaminated gases are discharged, and wherein said removed contaminated gases are passed through condensate recovery means to effect liquid collection.

22. A method for removing hydrocarbon contaminants from groundwater in a contaminated groundwater site, consisting essentially of the steps of:

first forming a treatment trench proximate to said contaminated groundwater site and collecting groundwater in said treatment trench, said groundwater having a surface area;

then subjecting the surface area of said groundwater collected in said trench to at least a partial vacuum via a vacuum pump creating an upwelling of said groundwater;

then providing in said groundwater a plurality of conduits, each of said conduits having a distal end and a proximal end, wherein the distal ends are submerged therein and the proximal ends are located above said groundwater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater as they are volatilized by said bubbles into contaminated gases that travel upward to the surface area of said groundwater, and wherein biological nutrients are added to said purging gas to promote aerobic microbiological degradation of said hydrocarbon contaminants; and then removing the contaminated gases from the surface area of said groundwater in said treatment trench by routing said contaminated gases through said vacuum pump where said contaminated gases are discharged.

23. A method for removing hydrocarbon contaminants from groundwater in a contaminated groundwater site, consisting essentially of the steps of:

first forming a treatment trench proximate to said contaminated groundwater site and collecting groundwater in said treatment trench, said groundwater having a surface area;

then subjecting the surface area of said groundwater collected in said trench to at least a partial vacuum via a vacuum pump creating an upwelling of said groundwater;

then providing in said groundwater a plurality of conduits, each of said conduits having a distal end and a proximal end, wherein the distal ends are submerged therein and the proximal ends are located above said groundwater;

then introducing a purging gas under at least atmospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater as they are volatilized by said bubbles into contaminated gases that travel upward to the surface area of said groundwater; and then removing the contaminated gases from the surface area of said groundwater in said treatment trench by routing said contaminated gases through said vacuum pump where said contaminated gases are discharged, and wherein said removed contaminated gases are passed through condensate recovery means to effect liquid collection.

24. A method for removing hydrocarbon contaminants from groundwater and/or wastewater contained in an above-ground treatment tank, consisting essentially of the steps of:

first introducing said contaminated groundwater and/or wastewater into said above-ground treatment tank, said groundwater and/or wastewater having a surface area;

then subjecting the surface area of said groundwater and/or wastewater in said treatment tank to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atomospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater, and wherein biological nutrients are added to said purging gas to promote aerobic microbiological degradation of said hydrocarbon contaminants; and then removing the contaminated gases from the surface area of said groundwater and/or wastewater in said treatment tank by routing said contaminated gases through said vacuum pump where said contaminated gases are discharged.

25. A method for removing hydrocarbon contaminants from groundwater and/or wastewater contained in an above-ground treatment tank, consisting essentially of the steps of:

first introducing said contaminated groundwater and/or wastewater into said above-ground treatment tank, said groundwater and/or wastewater having a surface area;

then subjecting the surface area of said groundwater and/or wastewater in said treatment tank to at least a partial vacuum via a vacuum pump creating an upwelling of said groundwater and/or wastewater;

then providing in said groundwater and/or wastewater a plurality of conduits, each of said conduits having a distal end and a proximal end, wherein the distal ends are submerged therein and the proximal ends are located above said groundwater and/or wastewater;

then introducing a purging gas under at least atomospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater in said treatment tank by routing said contaminated gases through said vacuum pump where said contaminated gases are discharged, and wherein said removed contaminated gases are passed through condensate recovery means to effect liquid collection.

26. A method for removing hydrocarbon contaminants from groundwater and/or wastewater contained in an above-ground treatment tank, consisting essentially of the steps of:

first introducing said contaminated groundwater and/or wastewater into said above-ground treatment tank, said groundwater and/or wastewater having a surface area;

then subjecting the surface area of said groundwater and/or wastewater in said treatment tank to at least a partial vacuum via a vacuum pump creating an upwelling of said groundwater and/or wastewater;

then providing in said groundwater and/or wastewater a plurality of conduits, wherein said conduits form a diffuser system, each of said conduits having a distal end and a proximal end, wherein the distal ends are submerged therein and the proximal ends are located above said groundwater and/or wastewater;

then introducing a purging gas under at least atomospheric pressure into the proximal ends of said conduits, each of said conduits having a small diameter chosen so that said gas will form a large volume of small bubbles as it flows from the distal ends thereof, said bubbles serving to remove said hydrocarbon contaminants from said groundwater and/or wastewater as they are volatilized by said bubbles into contaminated gases that travel upward to the surface area of said groundwater and/or wastewater; and then removing the contaminated gases from the surface area of said groundwater and/or wastewater in said treatment tank by routing said contaminated gases through said vacuum pump where said contaminated gases are discharged.

\* \* \* \* \*